US00RE44993E

(19) United States
(12) Reissued Patent
Vanko et al.

(10) Patent Number: US RE44,993 E
(45) Date of Reissued Patent: Jul. 8, 2014

(54) POWER TOOL ANTI-KICKBACK SYSTEM WITH ROTATIONAL RATE SENSOR

(75) Inventors: John Charles Vanko, Timonium, MD (US); Jason Leh, Rosedale, MD (US); David Beers, Dallastown, PA (US)

(73) Assignee: Black & Decker Inc., Newark, DE (US)

(21) Appl. No.: 13/600,722

(22) Filed: Aug. 31, 2012

Related U.S. Patent Documents

Reissue of:
(64) Patent No.: 7,681,659
Issued: Mar. 23, 2010
Appl. No.: 12/008,823
Filed: Jan. 14, 2008

U.S. Applications:
(63) Continuation of application No. 13/423,736, filed on Mar. 19, 2012, which is an application for the reissue of Pat. No. 7,681,659, which is a continuation of application No. 11/519,427, filed on Sep. 12, 2006, now Pat. No. 7,552,781, which is a continuation-in-part of application No. 11/254,146, filed on Oct. 19, 2005, now Pat. No. 7,410,006.

(60) Provisional application No. 60/620,283, filed on Oct. 20, 2004, provisional application No. 60/675,692, filed on Apr. 28, 2005.

(51) Int. Cl.
*B23Q 15/00* (2006.01)

(52) U.S. Cl.
USPC ..... 173/1; 173/4; 173/5; 173/6; 173/11; 173/176; 173/179

(58) Field of Classification Search
USPC ..... 173/4, 5, 6, 11, 176, 178, 179, 161
See application file for complete search history.

(56) References Cited

U.S. PATENT DOCUMENTS 1,990,035 A 2/1935 Kratz et al.
2,617,971 A 11/1952 Stack (Continued)

FOREIGN PATENT DOCUMENTS

DE 2442260 3/1976
DE 3239847 5/1983

(Continued)

OTHER PUBLICATIONS

Tonshoff, H.K., Developments and Trends in Monitoring and Control of Machining Processes, Annals of the CIRP vol. 37/2/1988 pp. 611-622.

(Continued)

*Primary Examiner* — Brian D Nash
(74) *Attorney, Agent, or Firm* — Harness, Dickey & Pierce, P.L.C.

(57) ABSTRACT

A control system is provided for use in a power tool. The control system includes: a rotational rate sensor having a resonating mass and a controller electrically connected to the rotational rate sensor. The rotational rate sensor detects lateral displacement of the resonating mass and generates a signal indicative of the detected lateral displacement, such that the lateral displacement is directly proportional to a rotational speed at which the power tool rotates about an axis of the rotary shaft. Based on the generated signal, the controller initiates a protective operation to avoid further undesirable rotation of the power tool. The controller may opt to reduce the torque applied to shaft to a non-zero value that enables the operator to regain control of the tool.

13 Claims, 10 Drawing Sheets

(56) References Cited

U.S. PATENT DOCUMENTS

| | | | |
|---|---|---|---|
| 2,776,653 | A | 1/1957 | Eaton |
| 3,083,508 | A | 4/1963 | Fegley et al. |
| 3,463,990 | A | 8/1969 | Ross |
| 3,554,302 | A | 1/1971 | Adkins et al. |
| 3,616,864 | A | 11/1971 | Sorensen |
| 3,773,117 | A | 11/1973 | Dussel |
| 3,847,229 | A | 11/1974 | Wanner et al. |
| 3,939,920 | A | 2/1976 | Hardiman et al. |
| 3,963,364 | A | 6/1976 | Lemelson |
| 4,060,115 | A | 11/1977 | Bocanegra Marquina |
| 4,066,133 | A | 1/1978 | Voss |
| 4,095,547 | A | 6/1978 | Benington |
| 4,104,778 | A | 8/1978 | Vliet |
| 4,143,467 | A | 3/1979 | Erspamer et al. |
| 4,249,117 | A | 2/1981 | Leukhardt et al. |
| 4,262,528 | A | 4/1981 | Holting et al. |
| 4,267,914 | A | 5/1981 | Saar |
| 4,305,471 | A | 12/1981 | Eshghy |
| 4,418,765 | A | 12/1983 | Mori et al. |
| 4,426,588 | A | 1/1984 | Weilnmann |
| 4,448,261 | A | 5/1984 | Kousek et al. |
| 4,487,270 | A | 12/1984 | Huber |
| 4,510,802 | A | 4/1985 | Peters |
| D279,254 | S | 6/1985 | Smith et al. |
| 4,573,556 | A | 3/1986 | Andreasson |
| 4,576,270 | A | 3/1986 | Baltz et al. |
| 4,587,468 | A | 5/1986 | Hotta |
| 4,601,206 | A | 7/1986 | Watson |
| 4,628,233 | A | 12/1986 | Bradus |
| 4,638,870 | A | 1/1987 | Kousek |
| 4,648,282 | A | 3/1987 | Alender et al. |
| 4,732,221 | A | 3/1988 | Dudek |
| 4,744,248 | A | 5/1988 | Stewart |
| 4,754,669 | A | 7/1988 | Verdier et al. |
| 4,759,225 | A | 7/1988 | Reynertson et al. |
| 4,793,226 | A | 12/1988 | Kress |
| 4,820,962 | A | 4/1989 | Millauer |
| 4,841,773 | A | 6/1989 | Stewart |
| 4,846,027 | A | 7/1989 | Lu |
| 4,871,033 | A | 10/1989 | Odoni et al. |
| 4,878,404 | A | 11/1989 | Liao |
| 4,885,511 | A | 12/1989 | Millauer et al. |
| 4,948,164 | A | 8/1990 | Hano et al. |
| RE33,379 | E | 10/1990 | Bradus |
| 4,961,035 | A | 10/1990 | Inaba et al. |
| 4,996,877 | A | 3/1991 | Stewart et al. |
| 5,014,793 | A | 5/1991 | Germanton et al. |
| 5,036,925 | A | 8/1991 | Wache |
| D326,043 | S | 5/1992 | Hasegawa et al. |
| 5,149,998 | A | 9/1992 | Wolcott |
| 5,155,421 | A | 10/1992 | Hansson |
| 5,156,221 | A | 10/1992 | Breitenmoser |
| 5,166,882 | A | 11/1992 | Stambaugh |
| 5,174,045 | A | 12/1992 | Thompson et al. |
| 5,200,661 | A | 4/1993 | Shramo et al. |
| 5,201,373 | A | 4/1993 | Bloechle |
| 5,212,862 | A | 5/1993 | Eshghy |
| 5,232,328 | A | 8/1993 | Owczarz et al. |
| D339,279 | S | 9/1993 | Baum |
| 5,241,861 | A | 9/1993 | Hulsing, II |
| 5,245,747 | A | 9/1993 | Hansson |
| 5,247,466 | A | 9/1993 | Shimada et al. |
| 5,284,217 | A | 2/1994 | Eshghy |
| 5,311,069 | A | 5/1994 | Austin |
| 5,345,382 | A | 9/1994 | Kao |
| 5,357,179 | A | 10/1994 | Abbagnaro et al. |
| 5,361,022 | A | 11/1994 | Brown |
| 5,365,155 | A | 11/1994 | Zimmerman et al. |
| 5,383,363 | A | 1/1995 | Kulmaczewski |
| 5,401,124 | A | 3/1995 | Hettich |
| 5,418,422 | A | 5/1995 | Vink et al. |
| 5,425,165 | A | 6/1995 | Shramo et al. |
| 5,440,218 | A | 8/1995 | Oldenkamp |
| 5,476,014 | A | 12/1995 | Lampe et al. |
| 5,484,026 | A | 1/1996 | Susaki et al. |
| 5,493,909 | A | 2/1996 | Araki |
| 5,535,306 | A | 7/1996 | Stevens |
| 5,538,089 | A | 7/1996 | Sanford |
| 5,557,990 | A | 9/1996 | Shin |
| 5,563,482 | A | 10/1996 | Shaw et al. |
| 5,584,619 | A | 12/1996 | Guzzela |
| 5,589,644 | A | 12/1996 | Becker et al. |
| 5,615,130 | A | 3/1997 | Bolan et al. |
| D378,727 | S | 4/1997 | Kikuchi |
| 5,619,085 | A | 4/1997 | Shramo |
| 5,635,638 | A | 6/1997 | Geen |
| 5,637,968 | A | 6/1997 | Kainec et al. |
| D387,964 | S | 12/1997 | Urvoy |
| 5,701,961 | A | 12/1997 | Warner et al. |
| 5,704,435 | A | 1/1998 | Meyer |
| 5,714,698 | A | 2/1998 | Tokioka et al. |
| D392,532 | S | 3/1998 | Shiao |
| D392,535 | S | 3/1998 | Vasudeva et al. |
| 5,730,232 | A | 3/1998 | Mixer |
| 5,738,177 | A | 4/1998 | Schell et al. |
| 5,754,019 | A | 5/1998 | Walz |
| 5,793,168 | A | 8/1998 | Vitunic |
| 5,795,988 | A | 8/1998 | Lo et al. |
| 5,806,401 | A | 9/1998 | Rajala et al. |
| 5,812,420 | A | 9/1998 | Takahashi |
| 5,831,402 | A | 11/1998 | Yang |
| 5,879,111 | A | 3/1999 | Stock et al. |
| 5,914,882 | A | 6/1999 | Yeghiazarians |
| 5,954,457 | A | 9/1999 | Stock et al. |
| 5,971,091 | A | 10/1999 | Kamen et al. |
| 5,981,557 | A | 11/1999 | Nagasawa et al. |
| 5,984,020 | A | 11/1999 | Meyer et al. |
| 5,996,707 | A | 12/1999 | Thome et al. |
| 6,005,489 | A | 12/1999 | Siegle et al. |
| 6,044,918 | A | 4/2000 | Noser et al. |
| 6,049,460 | A | 4/2000 | Lin |
| 6,055,142 | A | 4/2000 | Von Keudell et al. |
| 6,058,815 | A | 5/2000 | Habermehl |
| 6,062,939 | A | 5/2000 | Parker et al. |
| 6,111,515 | A | 8/2000 | Schaer et al. |
| 6,129,699 | A | 10/2000 | Haight et al. |
| 6,138,629 | A | 10/2000 | Masberg et al. |
| 6,147,626 | A | 11/2000 | Sakakibara |
| 6,158,929 | A | 12/2000 | Fisher |
| 6,161,629 | A | 12/2000 | Hohmann et al. |
| 6,209,394 | B1 | 4/2001 | Ferrari et al. |
| 6,236,177 | B1 | 5/2001 | Zick et al. |
| 6,387,725 | B1 | 5/2002 | Ferrari et al. |
| 6,408,252 | B1 | 6/2002 | DeSmet |
| 6,415,875 | B1 | 7/2002 | Mexner et al. |
| 6,479,958 | B1 | 11/2002 | Thompson et al. |
| 6,516,896 | B1 | 2/2003 | Bookshar et al. |
| 6,567,068 | B2 | 5/2003 | Rekimoto |
| 6,581,714 | B1 | 6/2003 | Kamen et al. |
| 6,612,034 | B2 | 9/2003 | Damstra |
| 6,640,733 | B2 | 11/2003 | Huffmeyer |
| D485,737 | S | 1/2004 | Schaub et al. |
| D493,888 | S | 8/2004 | Reschke |
| D494,829 | S | 8/2004 | Lin |
| 6,779,952 | B2 | 8/2004 | Zhang |
| 6,796,921 | B1 | 9/2004 | Buck et al. |
| 6,834,730 | B2 | 12/2004 | Gass et al. |
| 6,836,614 | B2 | 12/2004 | Gilmore |
| 6,842,991 | B2 | 1/2005 | Levi et al. |
| 6,843,140 | B2 | 1/2005 | Osselmann et al. |
| 6,871,128 | B2 | 3/2005 | Kouno et al. |
| 6,910,540 | B2 | 6/2005 | Totsu |
| 6,923,268 | B2 | 8/2005 | Totsu |
| 6,965,835 | B2 | 11/2005 | McGee et al. |
| 6,968,908 | B2 | 11/2005 | Tokunaga |
| D513,160 | S | 12/2005 | DeBoer et al. |
| 6,983,506 | B1 | 1/2006 | Brown |
| D517,634 | S | 3/2006 | Nunez et al. |
| 7,011,165 | B2 | 3/2006 | Kristen et al. |
| 7,036,703 | B2 | 5/2006 | Grazioli et al. |
| 7,055,620 | B2 | 6/2006 | Nadig et al. |
| 7,055,622 | B2 | 6/2006 | Bone |
| 7,090,030 | B2 | 8/2006 | Miller |
| 7,121,358 | B2 | 10/2006 | Gass et al. |

(56) References Cited

U.S. PATENT DOCUMENTS

| | | | |
|---|---|---|---|
| 7,121,598 | B2 | 10/2006 | Pourtier et al. |
| 7,134,364 | B2 | 11/2006 | Kageler et al. |
| 7,154,406 | B1 | 12/2006 | Judge et al. |
| D534,651 | S | 1/2007 | Bruce et al. |
| 7,182,148 | B1 | 2/2007 | Szieff |
| 7,197,961 | B2 | 4/2007 | Kageler |
| 7,225,884 | B2 | 6/2007 | Aerberhard |
| 7,234,536 | B2 | 6/2007 | Scholl |
| 7,331,406 | B2 | 2/2008 | Wottreng et al. |
| 7,347,158 | B2 | 3/2008 | Hawkes |
| D565,380 | S | 4/2008 | Rinner |
| 7,359,816 | B2 | 4/2008 | Kumar et al. |
| 7,372,226 | B2 | 5/2008 | Wiker et al. |
| 7,395,871 | B2 | 7/2008 | Carrier et al. |
| 7,400,106 | B2 | 7/2008 | DeCicco et al. |
| 7,410,006 | B2 | 8/2008 | Zhang |
| 7,456,603 | B2 | 11/2008 | Kanekawa et al. |
| 7,463,952 | B2 | 12/2008 | Bidou et al. |
| 7,469,753 | B2 | 12/2008 | Klemm et al. |
| 7,487,844 | B2 | 2/2009 | DeCicco et al. |
| 7,487,845 | B2 | 2/2009 | Carrier et al. |
| 7,504,791 | B2 | 3/2009 | Sieber et al. |
| 7,506,694 | B2 | 3/2009 | Stirm et al. |
| 7,526,398 | B1 | 4/2009 | Choi et al. |
| 7,546,785 | B2 | 6/2009 | Roehm et al. |
| 7,551,411 | B2 | 6/2009 | Woods et al. |
| 7,552,781 | B2 | 6/2009 | Zhang et al. |
| 7,565,844 | B2 | 7/2009 | Crass et al. |
| D606,827 | S | 12/2009 | Fritz et al. |
| 7,642,741 | B2 | 1/2010 | Sidman |
| 7,650,699 | B2 | 1/2010 | Yamamoto |
| 7,681,659 | B2 | 3/2010 | Zhang et al. |
| 7,682,035 | B2 | 3/2010 | Wuensch et al. |
| 7,688,028 | B2 | 3/2010 | Phillips et al. |
| 7,689,378 | B2 | 3/2010 | Kolen |
| D613,144 | S | 4/2010 | Lin |
| 7,708,085 | B2 | 5/2010 | DeCicco et al. |
| 7,723,953 | B2 | 5/2010 | Roehm et al. |
| D618,527 | S | 6/2010 | Deguglimo et al. |
| 7,730,963 | B2 | 6/2010 | Carrier et al. |
| 7,774,155 | B2 | 8/2010 | Sato et al. |
| 7,832,286 | B2 | 11/2010 | Nakagawa et al. |
| 7,861,796 | B2 | 1/2011 | DeCicco et al. |
| 7,882,899 | B2 | 2/2011 | Borinato et al. |
| 7,882,900 | B2 | 2/2011 | Borinato et al. |
| 7,900,715 | B2 | 3/2011 | Chen |
| 7,912,664 | B2 | 3/2011 | Rozelle |
| 7,926,585 | B2 | 4/2011 | Pozgay et al. |
| 7,936,148 | B2 | 5/2011 | Roehm et al. |
| 7,942,084 | B2 | 5/2011 | Wilson et al. |
| 8,025,106 | B2 | 9/2011 | Schmidt |
| 8,136,382 | B2 | 3/2012 | Stewart |
| 8,179,069 | B2 | 5/2012 | Matsunaga et al. |
| 2001/0042630 | A1 | 11/2001 | Kristen et al. |
| 2002/0033267 | A1 | 3/2002 | Schweizer et al. |
| 2002/0053892 | A1 | 5/2002 | Schaer et al. |
| 2002/0066632 | A1 | 6/2002 | Kristen et al. |
| 2002/0170754 | A1 | 11/2002 | Heinzmann |
| 2003/0000651 | A1 | 1/2003 | Genser |
| 2003/0037423 | A1 | 2/2003 | Siegel |
| 2003/0042859 | A1 | 3/2003 | Gorti et al. |
| 2003/0116332 | A1 | 6/2003 | Nadig et al. |
| 2003/0196824 | A1 | 10/2003 | Gass et al. |
| 2004/0011632 | A1 | 1/2004 | Hellmann et al. |
| 2004/0069511 | A1 | 4/2004 | Spielmann et al. |
| 2004/0104034 | A1 | 6/2004 | Osselmann et al. |
| 2004/0182175 | A1 | 9/2004 | Day et al. |
| 2004/0211573 | A1 | 10/2004 | Carrier et al. |
| 2004/0226424 | A1 | 11/2004 | O'Banion et al. |
| 2004/0226728 | A1 | 11/2004 | Boeni et al. |
| 2005/0000998 | A1 | 1/2005 | Grazioli et al. |
| 2005/0217874 | A1 | 10/2005 | Forster et al. |
| 2006/0081368 | A1 | 4/2006 | Rosine et al. |
| 2006/0081386 | A1 | 4/2006 | Zhang et al. |
| 2006/0103733 | A1 | 5/2006 | Grady et al. |
| 2006/0124331 | A1 | 6/2006 | Stirm et al. |
| 2006/0243469 | A1 | 11/2006 | Webster |
| 2007/0068480 | A1 | 3/2007 | Wiker et al. |
| 2007/0084613 | A1 | 4/2007 | Zhang et al. |
| 2007/0095634 | A1 | 5/2007 | Misuda |
| 2007/0144270 | A1 | 6/2007 | Crass et al. |
| 2007/0256914 | A1 | 11/2007 | Lohr et al. |
| 2007/0281274 | A1 | 12/2007 | Schraffran et al. |
| 2008/0011102 | A1 | 1/2008 | Schell et al. |
| 2008/0110653 | A1 | 5/2008 | Zhang et al. |
| 2008/0276760 | A1 | 11/2008 | Kim |
| 2009/0051306 | A1 | 2/2009 | Matsunaga et al. |
| 2009/0065225 | A1 | 3/2009 | Forster et al. |
| 2009/0078057 | A1 | 3/2009 | Schultz et al. |
| 2009/0120657 | A1 | 5/2009 | Carrier et al. |
| 2009/0139738 | A1 | 6/2009 | Lippek |
| 2009/0211774 | A1 | 8/2009 | Dvells, Jr. |
| 2009/0295313 | A1 | 12/2009 | Suzuki et al. |
| 2010/0188245 | A1 | 7/2010 | Nielsen et al. |
| 2010/0189887 | A1 | 7/2010 | Nielsen et al. |
| 2010/0245086 | A1 | 9/2010 | Nielsen et al. |
| 2010/0247754 | A1 | 9/2010 | Nielsen et al. |
| 2010/0256939 | A1 | 10/2010 | Borenstein |
| 2010/0263591 | A1 | 10/2010 | Nielsen et al. |
| 2010/0263891 | A1 | 10/2010 | Carrier et al. |
| 2011/0079406 | A1 | 4/2011 | Elsmark et al. |
| 2011/0153081 | A1 | 6/2011 | Romanov et al. |
| 2011/0160903 | A1 | 6/2011 | Romanov et al. |
| 2011/0202175 | A1 | 8/2011 | Romanov et al. |
| 2011/0301900 | A1 | 12/2011 | Patel |
| 2012/0000682 | A1 | 1/2012 | Grazioli |
| 2012/0090863 | A1 | 4/2012 | Puzio et al. |

FOREIGN PATENT DOCUMENTS

| | | | |
|---|---|---|---|
| DE | 3400124 | | 7/1985 |
| DE | 3938787 | | 5/1991 |
| DE | 4243317 | | 6/1993 |
| DE | 4204420 | | 8/1993 |
| DE | 4334933 | | 4/1995 |
| DE | 19540718 | | 5/1997 |
| DE | 19620124 | | 7/1997 |
| DE | 19632363 | | 1/1998 |
| DE | 19651124 | | 5/1998 |
| DE | 19726006 | | 9/1998 |
| DE | 19900882 | | 7/2000 |
| DE | 10117121 | | 10/2002 |
| DE | 10309414 | | 9/2004 |
| DE | 10318798 | | 11/2004 |
| DE | 10340710 | | 3/2005 |
| DE | 10348756 | | 5/2005 |
| DE | 102006016441 | | 10/2007 |
| DE | 102007048052 | | 4/2009 |
| DE | 102007062727 | | 7/2009 |
| DE | 102009007977 | | 7/2009 |
| DE | 102009001298 | | 9/2010 |
| EP | 0 018 603 | A | 11/1980 |
| EP | 0018603 | | 11/1980 |
| EP | 0199883 | | 11/1986 |
| EP | 0303651 | | 2/1989 |
| EP | 0345655 | | 12/1989 |
| EP | 0666148 | | 8/1995 |
| EP | 0771619 | | 5/1997 |
| EP | 0773854 | | 5/1997 |
| EP | 0841126 | | 5/1998 |
| EP | 0841127 | | 5/1998 |
| EP | 1008422 | | 6/2000 |
| EP | 1151828 | | 11/2001 |
| EP | 1188521 | | 3/2002 |
| EP | 1201373 | | 5/2002 |
| EP | 1379362 | | 1/2004 |
| EP | 1391271 | | 2/2004 |
| EP | 1447177 | | 8/2004 |
| EP | 1452278 | | 9/2004 |
| EP | 1470898 | | 10/2004 |
| EP | 1 524 084 | A | 4/2005 |
| EP | 1524084 | | 4/2005 |
| EP | 1670134 | | 6/2006 |
| EP | 1711308 | | 10/2006 |

(56) References Cited

FOREIGN PATENT DOCUMENTS

| | | |
|---|---|---|
| EP | 1878541 | 1/2008 |
| EP | 1900484 | 3/2008 |
| EP | 1398119 | 4/2010 |
| GB | 1261479 | 1/1972 |
| GB | 2086277 | 9/1981 |
| GB | 2306356 | 5/1997 |
| GB | 2347100 | 8/2000 |
| GB | 2400811 | 10/2004 |
| GB | 2420843 | 6/2006 |
| GB | 2436959 | 10/2007 |
| JP | 60252213 | 12/1985 |
| JP | 8197445 | 8/1986 |
| JP | 04065677 | 3/1992 |
| JP | 4226869 | 8/1992 |
| JP | 07270444 | 10/1995 |
| JP | 08128825 | 5/1996 |
| JP | 09038815 | 2/1997 |
| JP | 10156739 | 6/1998 |
| JP | 2005144625 | 6/2005 |
| RU | 2103156 | 1/1998 |
| WO | WO 88/06508 | 9/1988 |
| WO | WO2004024398 | 3/2004 |
| WO | WO2005095061 | 10/2005 |
| WO | WO2006045072 | 4/2006 |
| WO | WO2009032314 | 3/2009 |
| WO | WO2009/083306 | 7/2009 |
| WO | WO2009136840 | 11/2009 |

OTHER PUBLICATIONS

Husling, Rand, MEMS Inertial Rate and Acceleration Sensor, pp. 169-176.

FIG. 7

| Velocity (deg/sec) | Position (deg) | | | | | | | |
|---|---|---|---|---|---|---|---|---|
| | 5 | 10 | 15 | 20 | 25 | 30 | 35 | 40 |
| 10 | Normal operation | Normal operation | Normal operation | Normal operation | Normal operation | Normal operation | Protective mode | Protective mode |
| 20 | Normal operation | Normal operation | Normal operation | Normal operation | Normal operation | Normal operation | Protective mode | Protective mode |
| 30 | Normal operation | Normal operation | Normal operation | Normal operation | Normal operation | Normal operation | Protective mode | Protective mode |
| 40 | Normal operation | Normal operation | Normal operation | Normal operation | Normal operation | Normal operation | Protective mode | Protective mode |
| 50 | Normal operation | Normal operation | Normal operation | Normal operation | Normal operation | Normal operation | Protective mode | Protective mode |
| 60 | Normal operation | Normal operation | Normal operation | Normal operation | Normal operation | Normal operation | Protective mode | Protective mode |
| 70 | Normal operation | Normal operation | Normal operation | Normal operation | Normal operation | Normal operation | Protective mode | Protective mode |
| 80 | Normal operation | Normal operation | Normal operation | Normal operation | Normal operation | Normal operation | Protective mode | Protective mode |
| 90 | Normal operation | Normal operation | Normal operation | Normal operation | Normal operation | Normal operation | Protective mode | Protective mode |
| 100 | Normal operation | Normal operation | Normal operation | Normal operation | Protective mode | Protective mode | Protective mode | Protective mode |
| 110 | Normal operation | Normal operation | Normal operation | Normal operation | Protective mode | Protective mode | Protective mode | Protective mode |
| 120 | Normal operation | Normal operation | Normal operation | Normal operation | Protective mode | Protective mode | Protective mode | Protective mode |
| 130 | Normal operation | Normal operation | Normal operation | Normal operation | Protective mode | Protective mode | Protective mode | Protective mode |
| 140 | Normal operation | Normal operation | Normal operation | Normal operation | Protective mode | Protective mode | Protective mode | Protective mode |
| 150 | Normal operation | Normal operation | Normal operation | Normal operation | Protective mode | Protective mode | Protective mode | Protective mode |
| 160 | Normal operation | Normal operation | Normal operation | Normal operation | Protective mode | Protective mode | Protective mode | Protective mode |
| 170 | Normal operation | Normal operation | Normal operation | Normal operation | Protective mode | Protective mode | Protective mode | Protective mode |
| 180 | Normal operation | Normal operation | Normal operation | Normal operation | Protective mode | Protective mode | Protective mode | Protective mode |
| 190 | Normal operation | Normal operation | Normal operation | Normal operation | Protective mode | Protective mode | Protective mode | Protective mode |

POWER TOOL ANTI-KICKBACK SYSTEM WITH ROTATIONAL RATE SENSOR

Matter enclosed in heavy brackets [ ] appears in the original patent but forms no part of this reissue specification; matter printed in italics indicates the additions made by reissue.

CROSS-REFERENCE TO RELATED APPLICATIONS

This application is a continuation *reissue of U.S. Ser. No. 13/423,736, filed Mar. 19, 2012 which is a reissue of U.S. Pat. No. 7,681,659 issued Mar. 23, 2010 which is a continuation* of U.S. patent application Ser. No. 11/519,427 filed on Sep. 12, 2006, now U.S. Pat. No. 7,552,781 *issued Jun. 30, 2009* which in turn is a continuation-in-part of U.S. patent application No. 11/254,146 filed on Oct. 19, 2005, now U.S. Pat. No. 7,410,006 *issued Aug. 12, 2008* which claims benefit of U.S. Provisional Application No. 60/620,283, filed on Oct. 20, 2004 and U.S. Provisional Application No. 60/675,692 filed on Apr. 28, 2005[.]. The [disclosure] *disclosures* of the above applications [is] *are* incorporated herein by reference. *More than one reissue application has been filed for the reissue of U.S. Pat. No. 7,681,659. The reissue applications are application Ser. Nos. 13/600,722 (the present application), 13/423,736 and 13/600,927, all of which are continuation reissues of U.S. Pat. No. 7,681,659.*

FIELD

The disclosure relates generally to power tools and, more particularly, to a control system having a rotational rate sensor for detecting the onset of a rotational condition in a power tool.

BACKGROUND

Power tools typically employ a motor that imparts torque to a tool through a spindle. In the case of an electric drill, the motor spindle is coupled through a series of reducing gears to the chuck, which in turn holds the drill bit or other cutting/abrading tool, such as a hole saw, a grinding wheel or the like. Power screwdrivers as well a large rotary hammers work on a similar principle. In each of these cases, the function of the reducing gears or gear train is to reduce the rotational speed of the tool while increasing the rotational torque.

Power routers are somewhat different. The cutting tool of the hand-held router is typically direct coupled to the spindle of the motor. In this case, the full rotational speed of the motor is used without gear reduction to rotate the router bit at high speed. Reciprocating saw and jigsaws use yet another type of gear train that translates the rotational motion of the motor spindle to reciprocating movement.

Generally speaking, all of these power tools may suddenly encounter an impending kickback condition at which time the output torque rapidly rises because of local changes in workpiece hardness, workpiece binding, tool obstruction from burrs and so forth. For example, when drilling a hole with a power drill, some workpieces will develop burrs on the tool exit side of the workpiece. These burrs can engage the flutes of the drill bit, thereby causing a rapid increase in torque as the drill tries to break free. In some instances, the burrs may stop drill bit rotation, thereby causing a strong reaction torque that is imparted to the tool operator as the motor turns the tool in the operator's grasp (rather than turning the drill bit). This reaction is can be problematic if the operator is standing on a ladder and/or holding the tool over their head. A related phenomenon also occurs with power saws. These conditions are hereinafter generally referred to as kickback conditions, regardless of the particular power tool involved or the specific circumstance which give rise to the condition.

Therefore, it is desirable to provide an improved technique for detecting the onset of such kickback conditions in power tools. The statements in this section merely provide background information related to the present disclosure and may not constitute prior art.

SUMMARY

In one aspect of the disclosure, a control system is provided for use in a power tool. The control system includes: a rotational rate sensor having a resonating mass and a controller electrically connected to the rotational rate sensor. The rotational rate sensor detects lateral displacement of the resonating mass and generates a signal indicative of the detected lateral displacement, such that lateral displacement is directly proportional to a rotational speed at which the power tool rotates about an axis of the rotary shaft. Based on the generated signal, the controller initiates a protective operation to avoid undesirable rotation of the power tool.

In another aspect of the disclosure, the control scheme employed by the power tool may initiate different protective operations for different tool conditions.

In different aspect of the disclosure, the control scheme may initiate a protective operations based on input from two different sensors.

In yet another aspect of the disclosure, the control scheme employed by the power tool may initiate protective operations based on the rotational energy experienced by the tool.

For a more complete understanding of the invention, its objects and advantages, reference may be made to the following specification and to the accompanying drawings.

BRIEF DESCRIPTION OF THE DRAWINGS

FIG. 7 depicts an exemplary look-up table which may be used by the control system;

Figure 1:
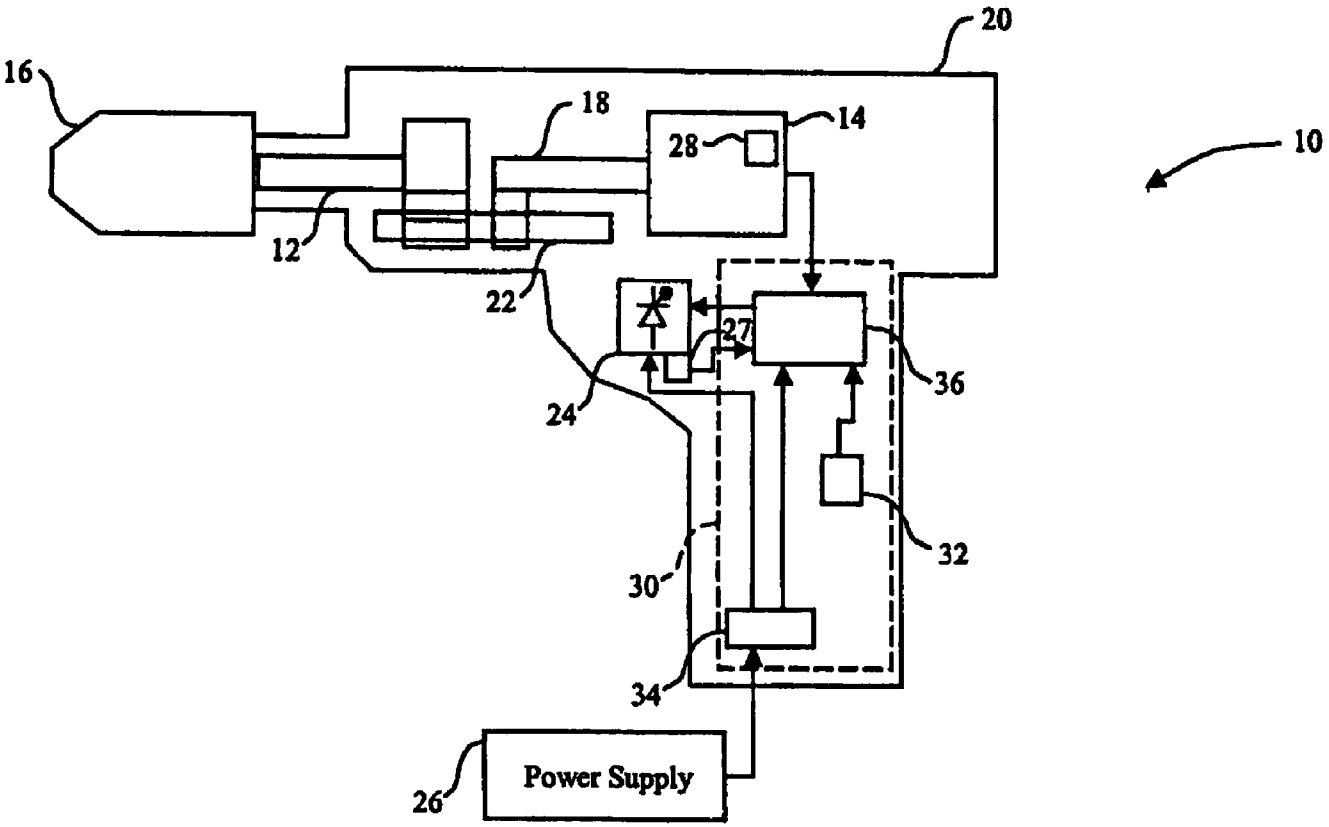
FIG. 1 is a longitudinal sectional view of an exemplary rotary hammer configured in accordance with the present disclosure.

The drawing described herein are for illustration purposes only and are not intended to limit the scope of the present disclosure in any way.

DETAILED DESCRIPTION

FIG. 1 illustrates an exemplary power tool 10 having a rotary shaft. In this example, the power tool is a hand held rotary hammer. While the following description is provided with reference to a rotary hammer, it is readily understood that the broader aspects of this disclosure are applicable to other types of power tools having rotary shafts, such as drills, circular saws, angle grinders, screw drivers and polishers.

In general, the rotary hammer includes a spindle 12 (i.e., a rotary shaft) drivably coupled to an electric motor 14. A chuck 16 is coupled at one end of the spindle 12; whereas a drive shaft 18 of the electric motor 14 is connected via a transmission 22 to the other end of the spindle 12. These components are enclosed within a housing 18. Operation of the tool is controlled through the use an operator actuated switch 24 embedded in the handle of the tool. The switch regulates current flow from a power supply 26 to the motor 14. The power tool may further include a temperature sensor 27. Although a few primary components of the rotary hammer are discussed above, it is readily understood that other components known in the art may be needed to construct an operational rotary hammer.

The power tool 10 is further configured with a control system 30 for detecting and preventing torque conditions which may cause the operator to lose control of the tool. The control system 30 may include a rotational rate sensor 32, a current sensor 34, and a microcontroller 36 embedded in the handle of the power tool 10. Under certain operating conditions, the power tool 10 may rotate in the operator's grasp. In a rotary hammer, the rotational rate sensor 32 is configured to detect rotational motion of the tool about the longitudinal axis of the spindle 12. The rotational rate sensor 32 in turn communicates a signal indicative of any rotational motion to the controller 36 for further assessment. For different power tools, it is envisioned that the sensor may be disposed in a different location and/or configured to detect motion along a different axis.

In a preferred embodiment, the operating principle of the rotational rate sensor 32 is based on the Coriolis effect. Briefly, the rotational rate sensor is comprised of a resonating mass. When the power tool is subject to rotational motion about the axis of the spindle, the resonating mass will be laterally displaced in accordance with the Coriolis effect, such that the lateral displacement is directly proportional to the angular rate. It is noteworthy that the resonating motion of the mass and the lateral movement of the mass occur in a plane which is orientated perpendicular to the rotational axis of the rotary shaft. Capacitive sensing elements are then used to detect the lateral displacement and generate an applicable signal indicative of the lateral displacement. An exemplary rotational rate sensor is the ADXRS150 or ADXRS300 gyroscope device commercially available from Analog Devices. Other types of rotational sensors, such as angular speed sensors, accelerometers, etc., are also within the scope of this disclosure.

The microcontroller 36 assesses the rotational motion of the tool to detect rotational conditions which may cause the operator to lose control of the tool. Upon detecting an unacceptable rotational condition, the microcontroller 36 will initiate a protective operation intended to minimize and/or avoid any undesired rotation of the power tool. For instance, when the angular velocity of the tool exceeds some empirically derived threshold, the microcontroller may cut power to the motor. A few exemplary techniques for assessing the rotational condition of the tool are further described below. It is readily understood that other techniques for assessing the rotational condition of the tool are also within the scope of this disclosure.

Figure 2:
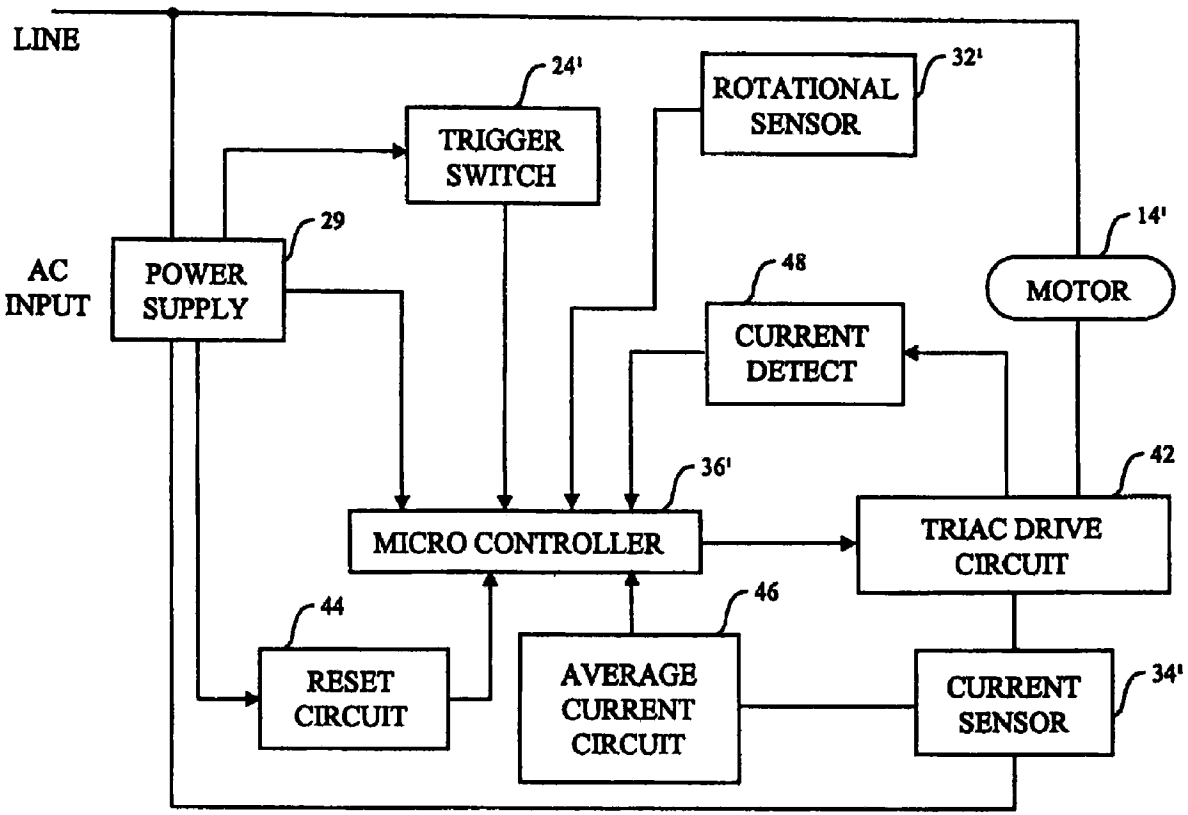
FIG. 2 is simplified block diagram of an exemplary control system in accordance with present disclosure.

Operation of an exemplary control circuit 40 is further described below in relation to FIG. 2. A power supply circuit 29 is coupled to an AC power line input and supplies DC voltage to operate the microcontroller 36'. The trigger switch 24' supplies a trigger signal to the microcontroller 36' which indicates the position or setting of the trigger switch 24' as it is manually operated by the power tool operator. Drive current for operating the motor 14' is controlled by a triac drive circuit 42. The triac drive circuit 42 is, in turn, controlled by a signal supplied by microcontroller 36'. If desired, the control system 30' may include a reset circuit 44 which, when activated, causes the microcontroller 36' to be re-initialized.

The microcontroller 36' is also supplied with a signal from a current detector circuit 48. The current detector circuit 48 is coupled to the triac drive circuit 42 and supplies a signal indicative of the conductive state of the triac drive circuit 42. If for some reason the triac drive circuit 42 does not turn on in response to the control signal from the microcontroller 36', this condition is detected by the current detector circuit 48.

A current sensor 34' is connected in series with the triac drive circuit 42 and the motor 14'. In an exemplary embodiment, the current sensor 34' may be a low resistance, high wattage resistor. The voltage drop across the current sensor 34' is measured as an indication of actual instantaneous motor current. The instantaneous motor current is supplied to an average current measuring circuit 46 which in turn supplies the average current value to the microcontroller 36'. The microcontroller 36' may use the average current to evaluate the rotational condition of the tool.

In operation, the trigger switch 24' supplies a trigger signal that varies in proportion to the switch setting to the microcontroller 36'. Based on this trigger signal, the microcontroller 36' generates a control signal which causes the triac drive circuit 42 to conduct, thereby allowing the motor 14' to draw current. Motor torque is substantially proportional to the current drawn by the motor and the current draw is controlled by the control signal sent from the microcontroller to the triac drive circuit 42. Thus, the microcontroller 36' can control the torque imparted by the motor.

Pulse mode is an exemplary protective operation which may be initiated upon detecting a kickback condition. Upon detecting the onset of a kickback condition, the microcontroller 36' may operate the motor 14' in a pulse mode. During pulse mode, the motor current is pulsed at a predetermined frequency with a predetermined on-time. In one exemplary embodiment, the series of current pulses is designed such that the operator may regain control of a twisting tool. For example, the time between pulses may be set between 0.1 and 1 second. Alternatively, the series of current pulses create torque pulses that may have a peak torque that is greater than the average torque delivered by the spindle 12. In this way, the torque pulses may allow the tool 10 to break through the burrs or workpiece restrictions that are causing the impending kickback condition. Further details regarding this protection operation may be found in U.S. Pat. No. 6,479,958 which is incorporated herein by reference.

Another exemplary protective operation is to reduce the torque imparted to the spindle to a non-zero value that enables an operator of the tool to regain control of the tool. In the context of the control circuit 40 described above, the controller can override the trigger signal from the trigger switch or other operator input commands. Upon detecting a triggering rotational condition, the controller 36' sends a control signal to the triac drive circuit 46' which reduces the voltage which in turn reduces the current draw of the motor, thereby reducing the torque imparted to the spindle. For example, the torque could be reduced to 30% of its current operational amount or a predefined fixed torque level. The tool would operate at his reduced level until the operator released the trigger switch and re-engaged it or cycled tool power. Another method would involve resetting torque to its original operation level if the operator regains control of the tool. In this way, the operator has regained control of the tool without terminating or resetting operation of the tool.

Other techniques for reducing the torque imparted to the spindle are also within the scope of this disclosure. For example, DC operated motors are often controlled by pulse width modulation, where the duty cycle of the modulation is proportional the speed of the motor and thus the torque imparted by the motor to the spindle. In this example, the microcontroller may be configured to control the duty cycle of the motor control signal.

Alternatively, the power tool may be configured with a torque transmitting device interposed between the motor and the spindle. In this case, the controller may interface with the torque transmitting device to reduce torque. The torque transmitting device may take the form of a magneto-rheologocical fluid clutch which can vary the torque output proportional to the current fed through a magnetic field generating coil. It could also take the form of a friction plate, cone clutch or wrap spring clutch which can have variable levels of slippage based on a preload holding the friction materials together and thus transmitting torque. In this example, the preload could be changed by driving a lead screw supporting the ground end of the spring through a motor, solenoid or other type of electromechanical actuator. Other types of torque transmitting devices are also contemplated by this disclosure.

In other instances, the protective operation is intended to terminate or reset operation of the tool. Exemplary protective operations of this nature include (but are not limited to) disengaging the motor 14' from the spindle 12, braking the motor 14', braking the spindle 12, and disconnecting power to the motor 14'. Depending on the size and orientation of the tool 10, one or more of these protective operations may be initiated to prevent undesirable rotation of the tool 10.

Figure 3:
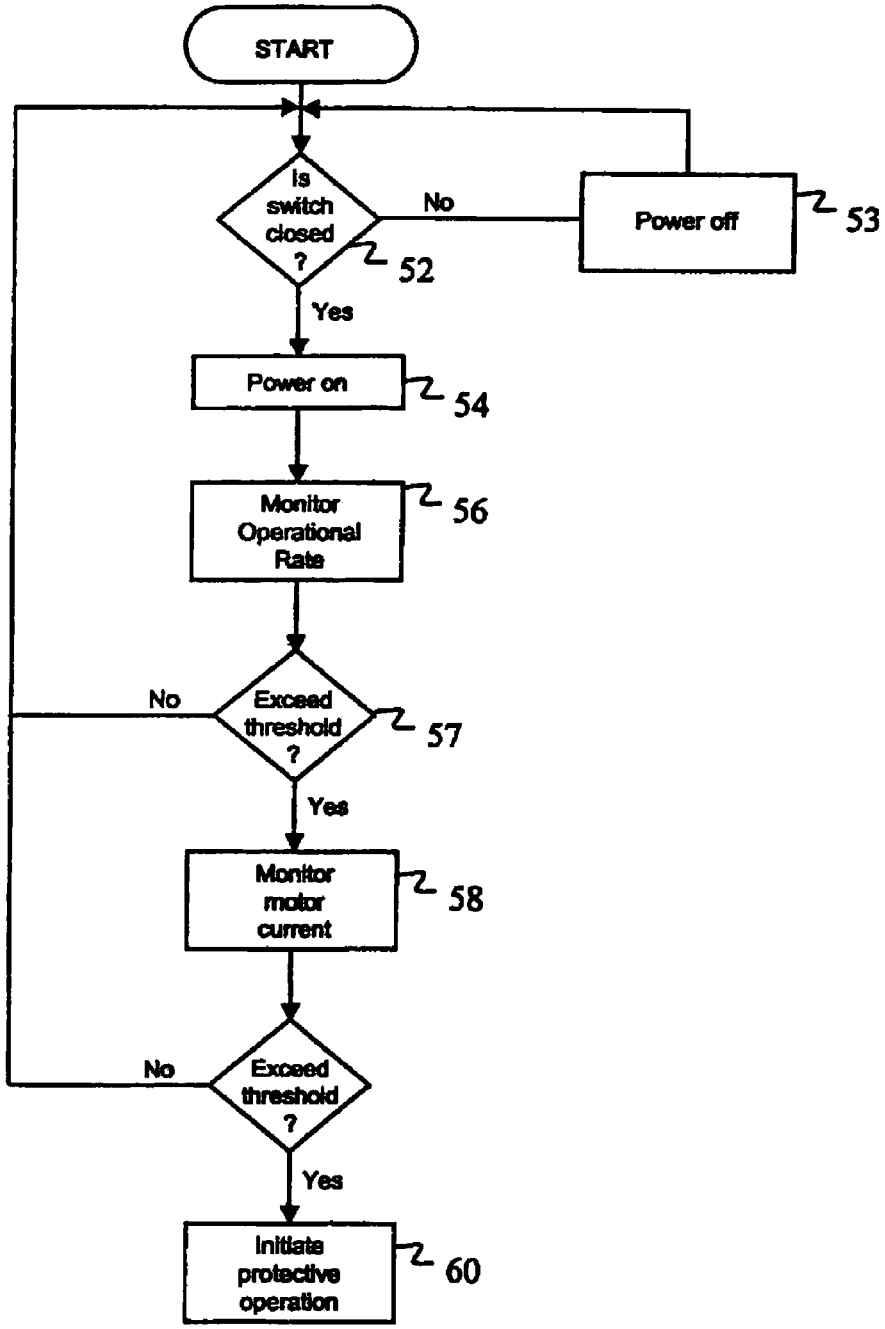
FIG. 3 is a flowchart illustrating an exemplary method for determining the onset of a kickback condition according to the present disclosure.

An exemplary method for detecting a rotational condition of the tool is illustrated in FIG. 3. First, the operator switch is checked at step 52 to determine if the tool is operating. If the switch is not closed, then power is not being supplied to the motor as indicated at 53. In this case, there is no need to monitor for kickback conditions. Conversely, if the switch is closed, then power is being supplied to the motor as indicated at 54.

During tool operation, rotational motion of the tool is monitored at 56 based on the signal from the rotational rate sensor. When the rotational rate of the tool exceeds some empirically derived threshold (as shown at 57), this may indicate the onset of kickback condition; otherwise, processing control returns to the beginning of the algorithm. In addition to rotational rate of the tool about its spindle axis, it is envisioned that the rotational displacement, rotational acceleration, or some combination thereof as derived from the sensor signal may be used to determine the onset of a kickback condition.

Prior to initiating some protective operation, the microcontroller also evaluates the current draw of the motor at 58. Specifically, the rate of change of the motor current is measured. When the rate of change is positive and exceeds some predetermined threshold, then one or more protective operations are initiated at 60. If either the rate of change is not positive or the rate of change does not exceeds the threshold, then processing control returns to the beginning of the algorithm. In this case, a sudden change in the current draw is optionally used to confirm the onset of the kickback condition. It is envisioned that inputs from other sensors, such as a temperature sensor, may be used in a similar manner. It is to be understood that only the relevant steps of the control scheme are discussed above, but that other software-implemented instructions may be needed to control and manage the overall operation of the tool.

In another aspect of the present invention, the control scheme employed by the power tool 10 may initiate different protective operations for different tool conditions. For example, the amount of angular displacement experienced by the tool may dictate different protective operations. When angular displacement is within a first range (e.g., less than 31°), the operator is presumed to have control of the tool and thus no protective operations are needed. When the angular displacement exceeds this first range, it may be presumed that the tool has encountered a kickback condition and therefore some protective operation may be needed. In this second range of angular displacement (e.g., between 30° to 90°), the control scheme may initiate a pulse mode in hope of breaking through the restrictions that are causing the impending kickback condition. In contrast, when the angular displacement exceeds the second range (e.g., greater than 90°), it may be presumed that the operator has lost control of the tool. In this instance, a different protective operation may be initiated by the control scheme, such as disconnecting the power to the motor.

Depending on the complexity of the control scheme, three or more ranges of displacement may be defined for a given power tool. Within a range, protective operations may be initiated based on the angular displacement or a combination of parameters, such as angular acceleration, angular velocity, motor current, rate of change of motor current, motor temperature, switch temperature, etc. It is readily understood that the number and size of the ranges may vary for different control schemes and/or different types of tools. It is also envisioned that different protective operations may be initiated based on ranges of other parameters (e.g., ranges of angular velocity). Likewise, one or more protective operations may be associated with different ranges (i.e., tool conditions).

Figure 4A:
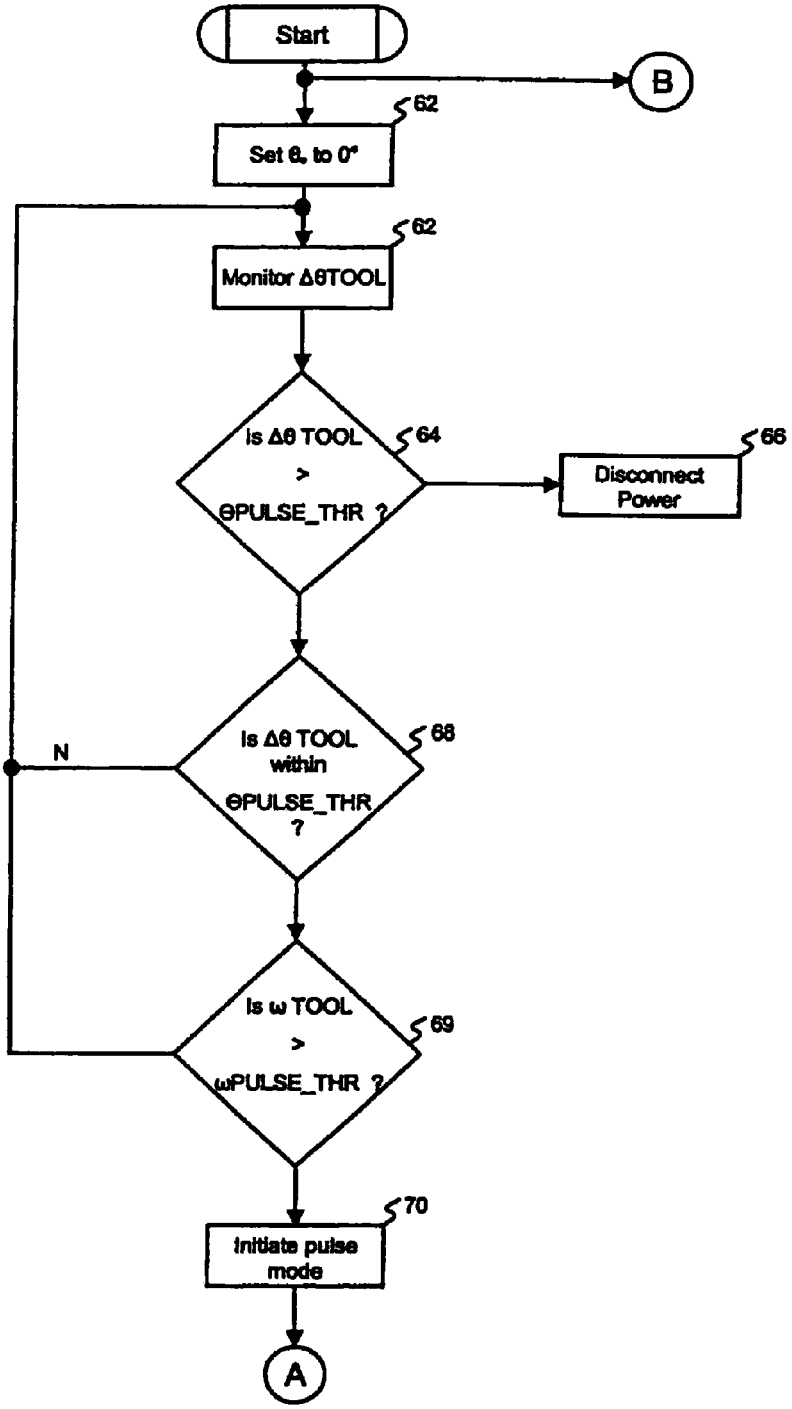
FIGS. 4A and 4B are flowcharts illustrating an exemplary method for determining a kickback condition based on angular displacement according to the present disclosure.
Figure 4B:
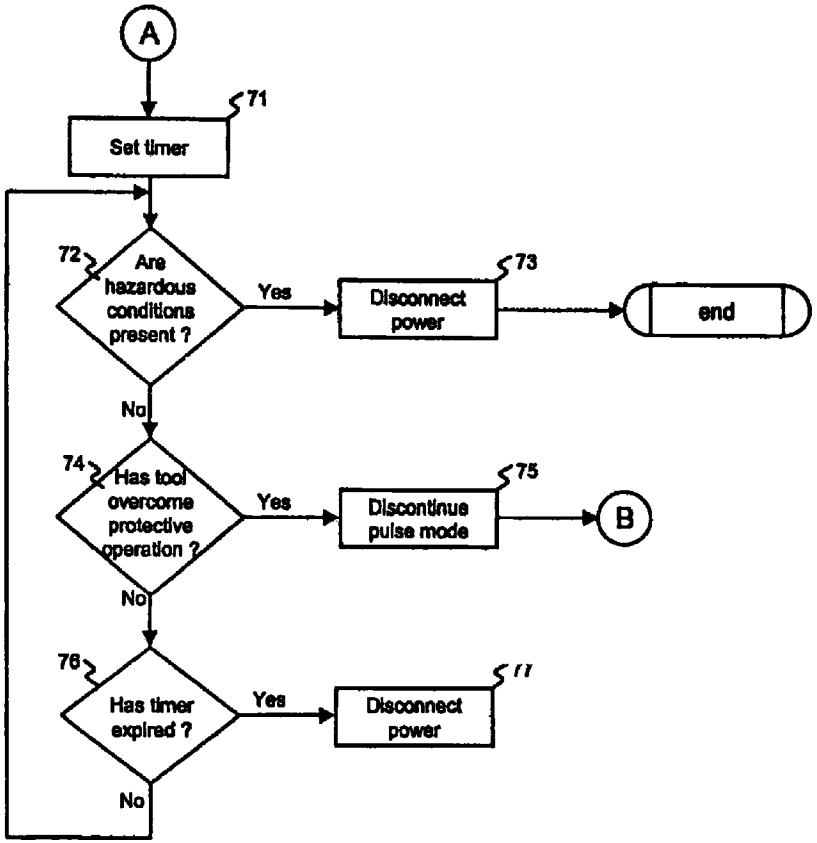

An exemplary method for detecting a rotational condition based on an angular displacement of the power tool is further described below in relation to FIGS. 4A and 4B. During tool operation, angular displacement is monitored in relation to a start point ($\theta_0$). In step 61, this starting point is initialized to zero. Any subsequent angular displacement of the tool is then measured in relation to this reference. Alternatively, the tool may employ a starting point reset function. At power-up, the starting point is set. If the operator repositions the tool (e.g., rotate it at a very slow rate), then the starting point is reset. For example, if the tool is rotated at a rate less than 5 degree per second, then the starting position is reset. Angular displacement is then measured from the new starting point.

Angular displacement of the tool is then monitored at step 62. In this exemplary embodiment, the angular displacement is measured in relation to the reference value ($\theta_0$) and derived from the rate of angular displacement over time or angular velocity ($\omega_{TOOL}$) as provided by a rotational rate sensor. While the rotational rate sensor described above is presently preferred for determining angular displacement of the tool, it is readily understood that this additional aspect of the present invention is not limited to this type of sensor. On the contrary, angular displacement may be derived from a different type of rotational rate sensor, an acceleration sensor or some other manner for detecting rotational displacement of the tool.

Different protective operations may be initiated based on the amount of angular displacement as noted above. Angular displacement is assessed at steps 64 and 68. When the angular displacement exceeds some upper threshold ($\theta_{zone2_min}$), then a first protective operation is initiated at step 66. In this example, power to the motor is disconnected, thereby terminating operation of the tool.

When the angular displacement exceeds some lower threshold ($\theta_{zone1_min}$), then a different protective operation, such as pulsing the motor current, may be initiated at 70. In this exemplary embodiment, an instantaneous measure of angular velocity must also exceed some minimum threshold before a pulse mode is initiated as shown at step 69. If neither of these criteria are met, no protective actions are taken and operating conditions of tool continue to be monitored by the control scheme.

During pulse mode, the control scheme continues to monitor tool operating conditions. Hazardous conditions may be monitored as shown at step 72. For instance, to prevent motor burn up, motor current may be monitored. If the motor current spikes above some predefined threshold, then power to the motor is disconnected at 73. To protect the tool operator, angular displacement may also be monitored. If angular displacement exceeds a threshold indicative of lost control, then the power to the motor is also disconnected. It is readily understood that other types of hazardous conditions may be monitored.

In addition, pulse mode is only maintained for a brief period of time. A timer is initiated at step 71 and pulse mode continues until the timer has expired as shown at 76. During this time, the control scheme may also monitor if the restrictions that caused the kickback condition have been overcome as shown at step 74. If the restrictions are overcome, then pulse mode is discontinued at step 75. When the timer expires without overcoming the restrictions, then power to the motor is disconnected as shown at 77.

Figure 5:
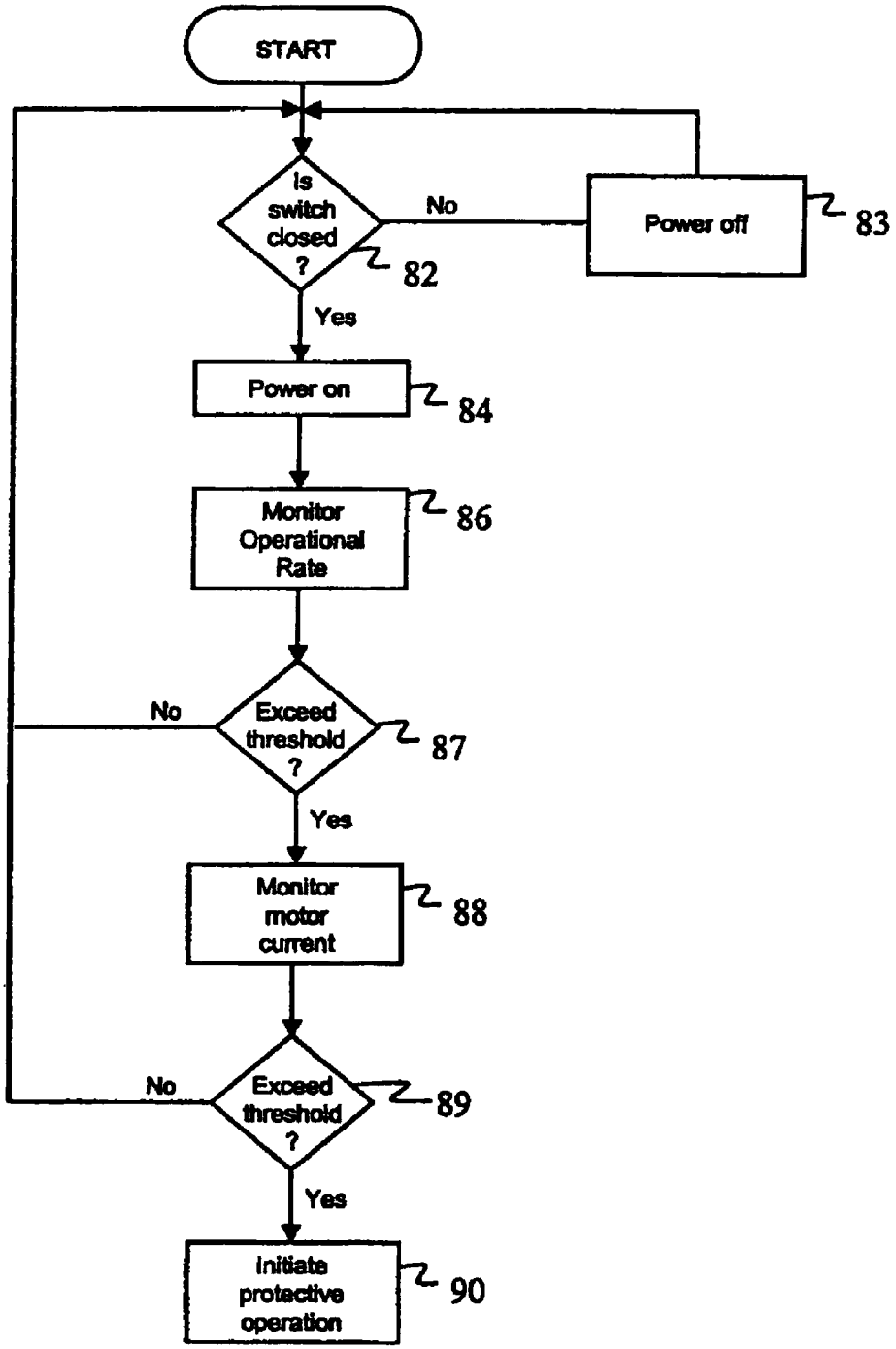
FIG. 5 is a flowchart illustrating an exemplary method for determining a kickback condition based input from two different sensors according to the present disclosure.

An exemplary method for detecting a rotational condition based on input from at least two sensors is described below in relation to FIG. 5. First, the operator switch is checked at step 82 to determine if the tool is operating. If the switch is not closed, then power is not being supplied to the motor as indicated at 83. In this case, there is no need to monitor for kickback conditions. Conversely, if the switch is closed, then power is being supplied to the motor as indicated at 84.

During tool operation, rotational motion of the tool is monitored at 86 based on the signal from the rotational rate sensor. When the rotational rate of the tool exceeds some empirically derived threshold (as shown at 87), this may indicate the onset of kickback condition; otherwise, processing control returns to the beginning of the algorithm. In addition to rotational rate of the tool about its spindle axis, it is envisioned that the rotational displacement, rotational acceleration, or some combination thereof as derived from the sensor signal may be used to determine the onset of a kickback condition.

Prior to initiating some protective operation, the microcontroller also evaluates the current draw of the motor at 88. Specifically, the rate of change of the motor current is measured. When the rate of change is positive and exceeds some predetermined threshold, then one or more protective operations are initiated at 90. If either the rate of change is not positive or the rate of change does not exceeds the threshold, then processing control returns to the beginning of the algorithm. In this case, a sudden change in the current draw is used to confirm the onset of the kickback condition. While the above description was provided with reference to a rotational rate sensor and a current sensor, it is readily understood that the broader aspects of the present invention encompass making such a determination may be based on input from other types of sensors.

Determination of a rotational condition may also be based on other types of criteria. For example, a rotational condition may be assessed based on the rotational energy experienced by the power tool. In this example, rotational energy is defined as $E_{\omega_TOOL}=(I)(\omega_{TOOL})^2$, where I is the moment of inertia and $\omega_{TOOL}$ is the angular velocity. For this computation, the rate of angular displacement could be measured by a rotational rate sensor; whereas, the moment of inertia of the tool ($I_{TOOL}$) could be preprogrammed into the controller based on the mass properties of the power tool (e.g., mass, rotation inertia and a center of gravity position) and a distance measure between the center of gravity position and the spindle axis. Initiating a protective operation based on $E_{\omega_TOOL}$ is desirable because the energy condition is not tool specific and therefore could be applied to a variety of anti-kickback applications. Other criteria for determining a kickback condition are also within the broader aspects of the present invention.

Figure 6:
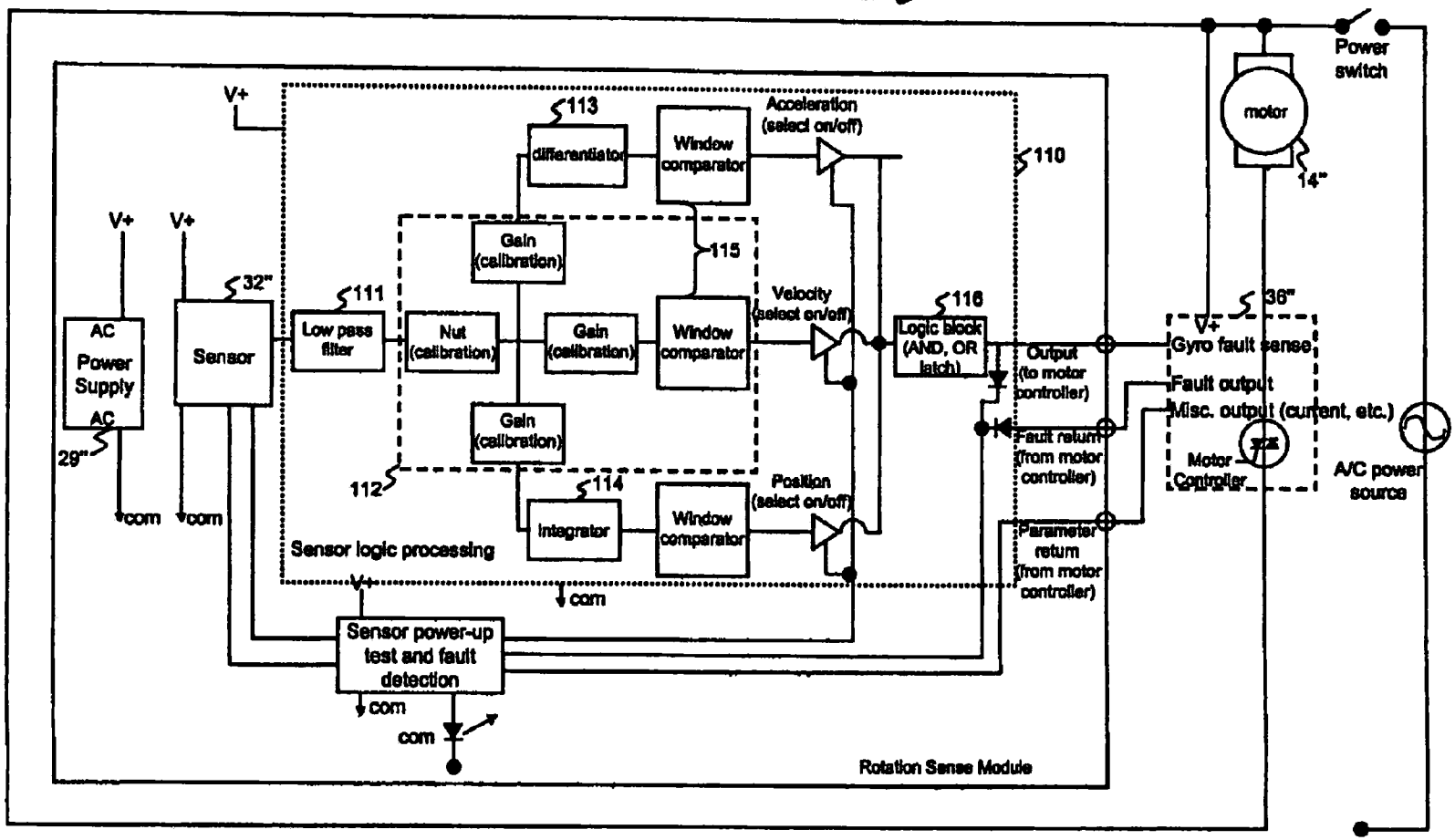
FIG. 6 is a block diagram of another exemplary control system in accordance with the present disclosure.

FIG. 6 depicts another exemplary control system 100. The control system is comprised generally of a rotational rate sensor 32", sensor processing logic 110, a motor controller 36", a motor 14" and a power supply 29". The rotational sensor 32" may be a single sensor, such as a gyroscope or accelerometer, or two or more sensors disposed within the tool. Sensor processing logic 110 may be implemented in software or hardware. Likewise, power-up and calibration functions may be performed with hardware, software or combination thereof.

During normal tool operation, sensor output is processed as follows. In this exemplary embodiment, the sensor output is rotational velocity. The sensor output passes through a low pass filter 111 before going into a null point and gain calibration routine 112. The purpose of the calibration routine is to remove any offset and compensate for any gains of the rate sensor before determining rotational conditions. Through either software or hardware means, the rate signal is then integrated at 113 to get position and derived at 114 to get acceleration. All three of the signals are then input to a comparator 115 which checks whether or not the value has exceeded a defined threshold. A logic block 116 (e.g., AND, OR, etc.) is configured so that any or all of the thresholds must be met before indicating a trip signal which is sent to the motor controller 36". Although the tests are shown as comparators on position, rate, or acceleration, it is noted that the tests are not limited to thresholds alone. Combinations of each variable can be used such as if the rate is less than W then position must be greater than X for a trip event to occur. In another example, if rate is greater than Y then position must be greater than Z for a trip to occur.

In lieu of comparison functions, the control system may employ a look-up table as shown in FIG. 7. In this example, rotational position is charted against rotational velocity. Look-up tables having other parameters and further dimensions are also contemplated. Additionally, the values in the table may indicate the type of protective operation or point to another table for more processing.

Figure 8:
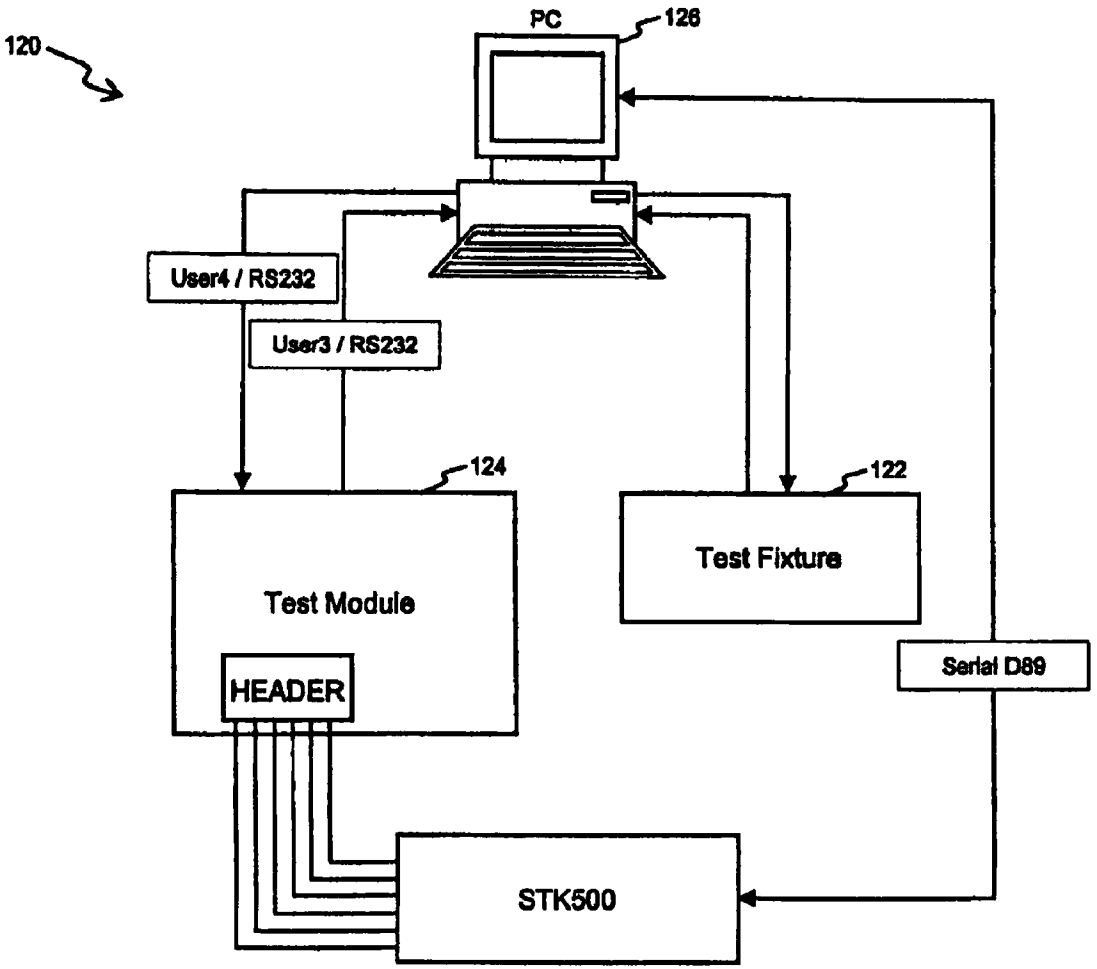
FIG. 8 illustrates an exemplary calibration system for a power tool configured with the control system.

FIG. 8 illustrates an exemplary calibration system 120 for a power tool 10 configured with the control system described above. The calibration system 120 is generally comprised of a test fixture 122, a test module 124, and a personal computer 126. To calibrate a power tool, the test module is first removed from the power tool and affixed to the test fixture 122. The rotational rate sensor along with the software routines which implement the control schemes described above are contained within the test module 124. The test fixture 122 is generally operable to rotate the test module 124 in a manner that may be experienced when module resides in the power tool. The personal computer 126 is configured to control operation of the test fixture 122 in accordance with a calibration routine as well as to interface with the test module 124 during the calibration process. It is also envisioned that in other configurations the entire power tool may affixed to and rotated by the test fixture.

Figure 9:
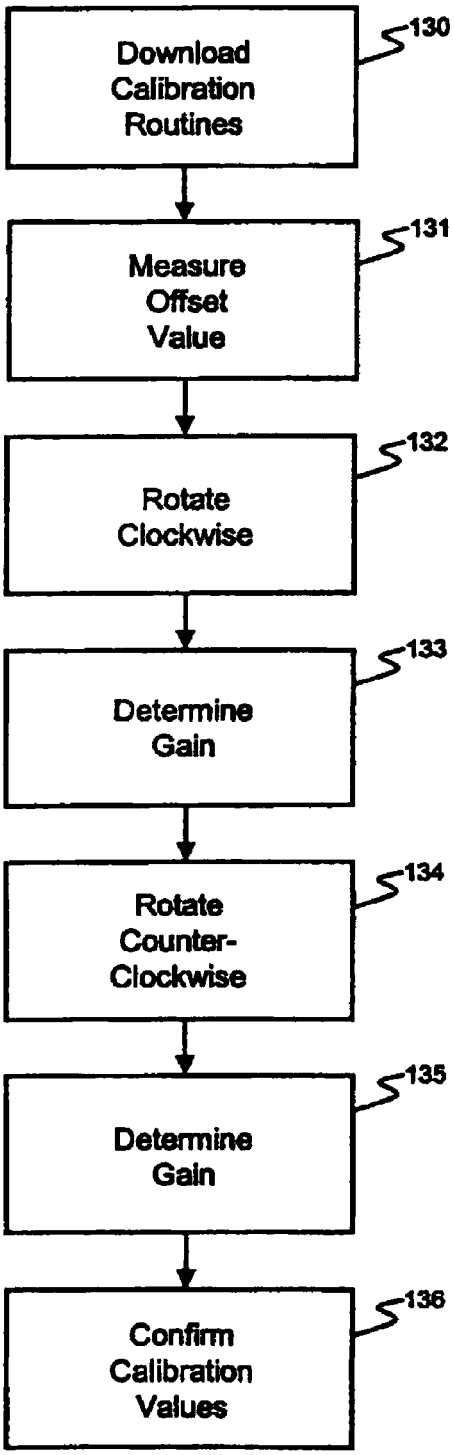
FIG. 9 illustrates an exemplary calibration procedure which may be employed by the control system.

An exemplary calibration procedure for a power tool is further described in relation to FIG. 9. First, a calibration routine is downloaded at 130 from the PC into the test module 124. The calibration routine cooperatively operates with the software routines of the control system to determine calibration values for the control system. The calibration procedure begins with the test module 124 measuring the output of the rotational rate sensor at 131 while the power tool remains stationary. This measured output serves as an offset or null calibration value (i.e., output value of the sensor when angular velocity is zero) for the rotational rate sensor. Next, the personal computer commands the test fixture 132 to rotate the test module 124 (e.g., clockwise) at predefined angular velocity for a predefined period of time. For example, the test fixture 122 may rotate the test module 124 at 50 degrees per second until 50 degrees of rotation is reached. During this movement, the test module is capturing the angular velocity as reported by the rotational rate sensor. The test module will compare the angular velocity 133 as reported by the rotational rate sensor with the known angular velocity at which the test module was rotated by the test fixture to determine a gain value. The gain value is temporarily stored by the test module for subsequent processing.

The personal computer then commands the test fixture 134 to rotate the test module in an opposite direction (e.g., counter-clockwise) at a predefined angular velocity for a predefined period of time. The test module again captures the angular velocity as reported by the rotational rate sensor and compares these captured values 135 with the known angular velocity to determine another gain value. The second gain value is also stored by the test module. Thus, there is a gain value for each direction of tool rotation.

To confirm the calibration values, the personal computer re-executes the calibration procedure at 136. In other words, the test fixture is commanded to rotate the test module at the predefined angular velocity in one direction and then in the opposite direction. The test module again captures the angular velocity as reported by the rotational rate sensor. At this point, the test module adjusts the measured angular velocity using the applicable calibration values and compares the adjusted values to the known angular velocity at which the test module was rotated by the test fixture. If the adjusted values fall within some defined tolerance of the expected values, these calibration values are sent by the test module to the personal computer. These calibration values can then be downloaded into memory of a power tool. During operation, the control system of the power tool will use the calibration values to adjust the output reported by the rotational rate sensor. It is readily understood that this type of calibration procedure may be undertaken for each power tool or once for each family of power tools.

The above description is merely exemplary in nature and is not intended to limit the present disclosure, application, or uses.

What is claimed is:

[1. A method for initiating a protective response in a power tool having a rotary shaft, comprising:

monitoring rotational motion of the power tool about a longitudinal axis of the rotary shaft using a rotational motion sensor disposed in the power tool;

computing angular displacement of the power tool about the axis of the rotary shaft using a controller disposed in the power tool and based on input from the rotational motion sensor;

initiating a protective operation by the controller when an operating condition of the power tool exceeds a threshold and the angular displacement of the power tool falls within a range of angular displacements; and initiating a protective operation by the controller when the operating condition of the power tool is less than the threshold but the angular displacement of the power tool exceeds the range of angular displacements.]

[2. The method of claim 1 further comprises initiating a protective operation when angular velocity of the power tool about the axis exceeds a velocity threshold and the angular displacement of the power tool falls within the range of angular displacements.]

[3. The method of claim 1 further comprises initiating a protective operation when angular displacement of the power tool falls within a range of angular displacements and angular acceleration of the power tool about the axis exceeds an acceleration threshold.]

[4. The method of claim 1 further comprises arranging the rotational motion sensor at a location in the power tool spatially separated from the rotary shaft.]

[5. The method of claim 1 further comprises employing a rotational motion sensor that measures rotational velocity based on Coriolis acceleration.]

[6. The method of claim 1 wherein the protective operation when angular displacement of the power tool falls within a range of angular displacements is different than the protective operation when angular displacement of the power tool exceeds the range of angular displacements.]

[7. The method of claim 1 wherein the protective operation is selected from the group consisting of pulsing a motor of the power tool, braking the rotary shaft, braking the motor, disengaging the motor from the rotary shaft, discontinuing power delivered to the motor and reducing slip torque of a clutch disposed between the motor and the rotary shaft.]

[8. A method for initiating a protective response in a power tool having a motor drivably coupled to a rotary shaft to impart rotary motion thereto, comprising:

monitoring rotational motion of the power tool about a longitudinal axis of the rotary shaft using a rotational motion sensor disposed in the power tool;

determining angular displacement of the power tool about the axis of the rotary shaft from a baseline using a controller disposed in the power tool and based on input from the rotational motion sensor;

initiating a protective operation in the power tool by the controller when a first operating condition of the power tool exceeds a first operating threshold and angular displacement of the power tool falls within a first range of angular displacements; and initiating a protective operation in the power tool by the controller when a second operating condition of the power tool exceeds a second operating threshold and angular displacement of the power tool falls within a second range of angular displacements, where the second operating condition is different than the first operating condition and the second range of angular displacements is mutually exclusive of the first range of angular displacements.]

[9. The method of claim 8 further comprises initiating a protective operation when angular velocity of the power tool about the axis exceeds a velocity threshold and angular displacement of the power tool falls within the first range of angular displacements.]

[10. The method of claim 9 further comprises initiating a protective operation when angular velocity of the power tool is less than the velocity threshold and angular displacement of the power tool falls within the second range of angular displacements.]

[11. The method of claim 8 further comprises arranging the rotational motion sensor at a location in the power tool spatially separated from the rotary shaft.]

[12. The method of claim 8 further comprises employing a rotational motion sensor that measures rotational velocity based on Coriolis acceleration.]

[13. The method of claim 8 further comprises periodically resetting the baseline when angular velocity of the power tool about the axis is less than a velocity threshold.]

[14. The method of claim 8 wherein the protective operation is selected from the group consisting of pulsing a motor of the power tool, braking the rotary shaft, braking the motor, disengaging the motor from the rotary shaft, discontinuing power delivered to the motor and reducing slip torque of a clutch disposed between the motor and the rotary shaft.]

[15. A method for initiating a protective response in a power tool having a rotary shaft, comprising:

monitoring rotational motion of the power tool about a longitudinal axis of the rotary shaft using a rotational motion sensor disposed in the power tool;

computing angular displacement of the power tool about the axis of the rotary shaft from a baseline using a controller disposed in the power tool and based on input from the rotational motion sensor;

periodically resetting the baseline when angular velocity of the power tool about the axis is less than a velocity threshold;

initiating a protective operation by the controller when an operating condition of the power tool exceeds a threshold and the angular displacement of the power tool falls within a range of angular displacements; and initiating a protective operation by the controller when the operating condition of the power tool is less than the threshold but the angular displacement of the power tool exceeds the range of angular displacements.]

*16. A method for calibrating a power tool having a rotational rate sensor, comprising:*

*mounting the power tool to a test fixture, the power tool having a rotary shaft and a rotational rate sensor configured to detect rotational motion of the power tool about a longitudinal axis of the rotary shaft;*

*rotating the power tool at a known angular velocity about the longitudinal axis using the test fixture;*

*measuring, by the rotational rate sensor, an angular velocity of the power tool rotating about the longitudinal axis; and*

*computing a first difference between the measured angular velocity and the known angular velocity.*

*17. The method of claim 16 further comprises measuring output of the rotational rate sensor when the power tool is stationary on the test fixture to obtain an offset calibration value.*

*18. The method of claim 16 further comprises*

*adjusting the angular velocity measured by the rotational rate sensor using the difference; and*

*comparing the adjusted angular velocity to the known angular velocity to verify calibration of the tool.*

*19. The method of claim 16 further comprises*

*rotating the power tool at the known angular velocity in an opposite direction about the longitudinal axis using the test fixture;*

*measuring, by the rotational rate sensor, an angular velocity of the power tool rotating in the opposite direction about the longitudinal axis; and*

*computing a second difference between the measured angular velocity and the known angular velocity.*

*20. The method of claim 16 further comprises measuring angular velocity based on Coriolis acceleration.*

*21. The method of claim 16 further comprises*

*storing the differences in a memory of the power tool;*

*removing the power tool from the test fixture; and*

*adjusting, during operation of the power tool, output reported by the rotational rate sensor using the difference values.*

*22. A method for calibrating a power tool having a rotary shaft, comprising:*

*removing a test module from the power tool, the test module detachably couples to the power tool and houses a rotational rate sensor configured to detect rotational motion of the power tool about a longitudinal axis of the rotary shaft;*

*mounting the test module to a test fixture;*

*rotating the test module at a known angular velocity about the longitudinal axis using the test fixture;*

*measuring, the rotational rate sensor, an angular velocity of the test module rotating about the longitudinal axis; and*

*computing a first difference between the measured angular velocity and the known angular velocity.*

*23. The method of claim 22 further comprises measuring output of the rotational rate sensor when the test module is stationary on the test fixture to obtain an offset calibration value.*

*24. The method of claim 22 further comprises*

*adjusting the angular velocity measured by the rotational rate sensor using the difference; and*

*comparing the adjusted angular velocity to the known angular velocity to verify calibration of the tool.*

*25. The method of claim 22 further comprises*

*rotating the test module at a known angular velocity in an opposite direction about the axis using the test fixture;*

*measuring, by the rotational rate sensor, an angular velocity of the test module rotating in the opposite direction about the longitudinal axis; and*

*computing a second difference between the measured angular velocity and the known angular velocity.*

*26. The method of claim 22 further comprises measuring angular velocity based on Coriolis acceleration.*

*27. The method of claim 26 further comprises*

*storing the first and second differences in a memory of the test module;*

*removing the test module from the test fixture;*

*re-installing the test module in the power tool; and*

*adjusting, during operation of the power tool, output reported by the rotational rate sensor using the first and second differences.*

*28. A method for operating a power tool having a rotational rate sensor, comprising:*

*mounting the power tool to a test fixture, the power tool having a rotary shaft and a rotational rate sensor configured to detect rotational motion of the power tool about a longitudinal axis of the rotary shaft;*

*rotating the power tool at a known angular velocity about the longitudinal axis using the test fixture;*

*measuring, by the rotational rate sensor, an angular velocity of the power tool rotating about the longitudinal axis;*

*computing a difference between the measured angular velocity and the known angular velocity;*

*storing the difference in a memory of the power tool*

*monitoring rotational motion of the power tool about a longitudinal axis of the rotary shaft using a rotational motion sensor disposed in the power tool;*

*computing angular displacement of the power tool about the axis of the rotary shaft using a controller disposed in the power tool, the computation being based on input from the rotational motion sensor and the difference in the memory;*

*initiating a protective operation by the controller when an operating condition of the power tool exceeds a threshold and the angular displacement of the power tool falls within a range of angular displacements; and*

*initiating a protective operation by the controller when the operating condition of the power tool is less than the threshold but the angular displacement of the power tool exceeds the range of angular displacements.*

* * * * *